(12) United States Patent
Yuk et al.

(10) Patent No.: US 8,532,057 B2
(45) Date of Patent: Sep. 10, 2013

(54) HANDOVER SUPPORT METHOD USING DEDICATED RANGING CODE

(75) Inventors: Young Soo Yuk, Seoul (KR); Ki Seon Ryu, Seoul (KR); In Uk Jung, Incheon-si (KR); Yong Ho Kim, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 13/001,038

(22) PCT Filed: Jun. 25, 2009

(86) PCT No.: PCT/KR2009/003442
§ 371 (c)(1),
(2), (4) Date: Dec. 22, 2010

(87) PCT Pub. No.: WO2009/157725
PCT Pub. Date: Dec. 30, 2009

(65) Prior Publication Data
US 2011/0096752 A1    Apr. 28, 2011

Related U.S. Application Data

(60) Provisional application No. 61/075,345, filed on Jun. 25, 2008.

(51) Int. Cl.
*H04W 4/00*    (2009.01)
(52) U.S. Cl.
USPC ............ 370/331; 380/270; 455/437; 713/168

(58) Field of Classification Search
None
See application file for complete search history.

(56) References Cited

U.S. PATENT DOCUMENTS

| 2007/0086388 | A1 | 4/2007 | Kang et al. | |
|---|---|---|---|---|
| 2007/0191009 | A1 | 8/2007 | Hong et al. | |
| 2009/0109923 | A1* | 4/2009 | Kojima | 370/331 |
| 2009/0276629 | A1* | 11/2009 | Wu et al. | 713/175 |
| 2009/0327716 | A1* | 12/2009 | Raju et al. | 713/168 |
| 2010/0040014 | A1* | 2/2010 | Kang et al. | 370/329 |
| 2010/0268951 | A1* | 10/2010 | Ryu | 713/169 |

FOREIGN PATENT DOCUMENTS

WO    2008/069457 A1    6/2008

* cited by examiner

*Primary Examiner* — Chi Pham
*Assistant Examiner* — Mohammad Adhami
(74) *Attorney, Agent, or Firm* — Lee, Hong, Degerman, Kang & Waimey (57) ABSTRACT

The present invention discloses a variety of methods of supporting handover in a wireless access system. A handover support method according to an embodiment of the present invention includes the steps of: transmitting a handover request message to a first base station (serving base station); receiving a handover response message (UL grant or UL-MAP message) containing authentication information (M) from a second base station (target base station); deriving a dedicated code index (DCI) for instructing a dedicated ranging code by using the authentication information (M); transmitting the dedicated ranging code to the second base station on a non-contention basis; and receiving a ranging response message as a response for the dedicated ranging code.

10 Claims, 5 Drawing Sheets

HANDOVER SUPPORT METHOD USING DEDICATED RANGING CODE

CROSS-REFERENCE TO RELATED APPLICATIONS

This application is the National Stage filing under 35 U.S.C. 371 of International Application No. PCT/KR2009/003442, filed on Jun. 25, 2009, which claims the benefit of U.S. Provisional Application Ser. No. 61/075,345, filed on Jun. 25, 2008, the contents of which are all incorporated by reference herein in their entireties.

BACKGROUND OF THE INVENTION

1. Field of the Invention

The present invention relates to a method of supporting handover in a wireless access system.

2. Discussion of the Related Art

Hereinafter, handover and a ranging process will be described in brief.

Handover means that communication which is being performed is maintained as it is when a mobile station goes out of a cell zone of a serving base station and enters a cell zone of another base station. In other words, the handover means that exchange of channel or line is performed to maintain call which is being performed.

Handover can be divided into softer handover, soft handover, and hard handover.

Softer handover is handover performed within one cell, and means that a mobile station converts a current channel used within cell coverage to an excellent channel. Soft handover means that two neighboring channels are managed at the same time and one of the channels is finally disconnected. Soft handover can easily be implemented as the same frequency band is used in a CDMA mode. Hard handover means that a mobile station disconnects a current channel in which communication is being performed, and directly connects another channel.

The mobile station performs a ranging procedure after moving a cell zone of a base station currently in service to another cell zone of another base station and performing handover to another base station.

Ranging means a set of processes for maintaining connection quality (particularly, synchronization) of radio frequency (RF) communication between a base station and a mobile station in IEEE 802.16 or mobile Internet. Particularly, during OFDMA/TDD based multiple access, since a base station transmits data to several mobile stations based on one reference timing in a downlink, there is no problem in the downlink. However, since several mobile stations respectively transmit a signal in an uplink, radio wave delay may occur differently for each of the mobile stations. In this respect, as a separate timing synchronization method, a ranging procedure is performed between the base station and the mobile station. Namely, ranging is a procedure for exactly controlling synchronization of transmission time in several mobile stations.

For power control, and synchronization acquisition of an uplink between the mobile station and the base station, initial ranging, periodic ranging and hand-off (HO) ranging can be used. Also, bandwidth request ranging can be performed by the mobile station to request the base station of bandwidth.

Initial ranging is used for initial network entry and connection when the mobile station initially enters the base station (for example, when the mobile is powered on or when a long-term idle mode is converted into an active mode). Periodic ranging is periodically performed by the mobile station for synchronization tracking towards the base station. Handoff ranging is performed by the mobile station for synchronization with the base station during handoff. Bandwidth request (BR) ranging is performed to request uplink allocation from the base station. Bandwidth request ranging is performed by only a mobile station which has been already synchronized with the system.

If the base station receives a ranging request message from the mobile station, it generates a connection identifier (CID) of the corresponding mobile station. Afterwards, the base station performs re-negotiation, re-authentication, and re-registration with the base station.

The connection identifier CID means an address for identifying connection mapped into a service flow required between respective peers on a MAC sub-layer. The CID is included in a MAC PDU header. In other words, every connection between the base station and the mobile station is identified by the CID included in the MAC header, and the CID corresponds to a service flow identifier (SFID) that defines quality of service (QoS) parameters of a service flow related to the CID.

A management CID can be allocated from the base station when all mobile stations initially access the base station. In other words, the mobile station can be allocated with the management CID from the base station through a series of ranging and registration processes. The management CID can be divided into basic CID, primary CID and secondary CID.

The basic CID (BCID) is used by the base station to identify the mobile station at an initial access step. In other words, a MAC address of the mobile station is mapped into the basic CID. The primary CID (PCID) can be used for authentication message and dynamic resource allocation messages. Also, the secondary CID (SCID) can be used as option during a capability negotiation procedure of the mobile station.

In addition to the management CID, there are provided a transport CID (TCID) for service of user traffic, a broadcasting CID for broadcasting traffic, and a multicasting CID. In this case, the transport CID (TCID) can be allocated per connection generated between the mobile station and the base station.

Generally, after the mobile station performs handover from a serving base station to a target base station, the mobile station and the target base station can acquire synchronization through handover ranging. However, with the development of the communication technology, a fast handover method for reducing delay is required. In this respect, a method for performing faster handover and reducing a handover ranging process is required.

SUMMARY OF THE INVENTION

Accordingly, the present invention is directed to a method of supporting handover in a wireless access system, which substantially obviates one or more problems due to limitations and disadvantages of the related art.

An object of the present invention is to provide a method of supporting efficient handover in a wireless access system.

Another object of the present invention is to provide a method of optimizing a handover process by simplifying complicated processes and transmitting and receiving minimum information only.

Other object of the present invention is to provide a method for allocating a dedicated ranging code to optimize a handover ranging process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention discloses various methods of supporting handover in a wireless access system.

In one aspect of the present invention, a method of supporting handover comprises the steps of transmitting a handover request message to a first base station; receiving a handover response message, which includes handover related information, from the first base station; receiving a first message (UL grant or UL-MAP message), which includes authentication information, from a second base station; obtaining a dedicated code index (DCI) indicating a dedicated ranging code by using the authentication information; transmitting the dedicated ranging code to the second base station based on non-contention; and receiving a ranging response message in response to the dedicated ranging code.

The ranging response message includes timing alignment information, power adjustment information, handover procedure optimization information and CQICH allocation information. Also, the authentication information is generated by the second base station by using an authentication key (AK) of a mobile station, a CMAC key count of the mobile station and the dedicated code index. Also, the handover related information includes information on action time for performing handover and a handover indication field.

In another aspect of the present invention, a method of supporting handover comprises the steps of receiving a handover request message in a second base station from a first base station, the handover request message including an authentication key (AK) and a CMAC key count; transmitting a handover response message, which includes handover related information, to the first base station; allocating a ranging code index indicating a dedicated ranging code for performing non-contention based dedicated ranging with a mobile station; generating authentication information by using one or more of the authentication key, the CMAC key count and the ranging code index; and transmitting a first message, which includes the authentication information.

The method further comprises the steps of receiving the dedicated ranging code from the mobile station; and transmitting a ranging response message in response to the dedicated ranging code, the ranging response message including timing alignment information, power adjustment information, handover procedure optimization information and CQICH allocation information.

The handover related information includes information on action time for performing handover and a handover indication field.

In other aspect of the present invention, a method of supporting handover comprises the steps of receiving a first handover request message in a first base station from a mobile station; transmitting a second handover request message to a second base station, the second handover request message including an authentication key (AK) of the mobile station and a CMAC key count; receiving a second handover response message, which includes handover related information, from the second base station; transmitting a first handover response message, which includes the handover related information, to the mobile station.

The first handover response message and the second handover response message further include authentication information of the mobile station. In this case, the authentication information is generated by the second base station by using the authentication key (AK), the CMAC key count and a dedicated code index indicating a dedicated ranging code. Also, the handover related information includes information on action time for performing handover and a handover indication field.

According to the embodiments of the present invention, the following advantages can be obtained.

First of all, it is possible to efficiently support handover in accordance with the embodiments of the present invention.

Second, it is possible to optimize the handover process by simplifying complicated handover processes and transmitting and receiving minimum information only.

Third, it is possible to optimize the handover ranging process by using a method for allocating a dedicated ranging code in accordance with one embodiment of the present invention. Accordingly, delay time during handover can be minimized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), and an access point (AP). Also, the mobile station may be replaced with terms such as a user equipment (UE), a subscriber station (SS), a mobile subscriber station (MSS), a mobile terminal (MT) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station further include a hand-held PC, a notebook PC, a smart phone, and a multi mode-multi band (MM-MB) terminal.

In this case, the smart phone is a terminal provided with advantages of a mobile communication terminal and a PDA. The smart phone may mean a terminal in which a schedule management function of a PDA and data communication functions of facsimile transmission/reception, internet access, etc. are integrated on a mobile communication terminal. Also, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents.

Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m. In addition, base technical features or essential technical features which are not disclosed by the present invention are able to be referred by standard documents, such as TS36.211 and TS36.212, of the 3GPP LTE system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention.

Figure 1:
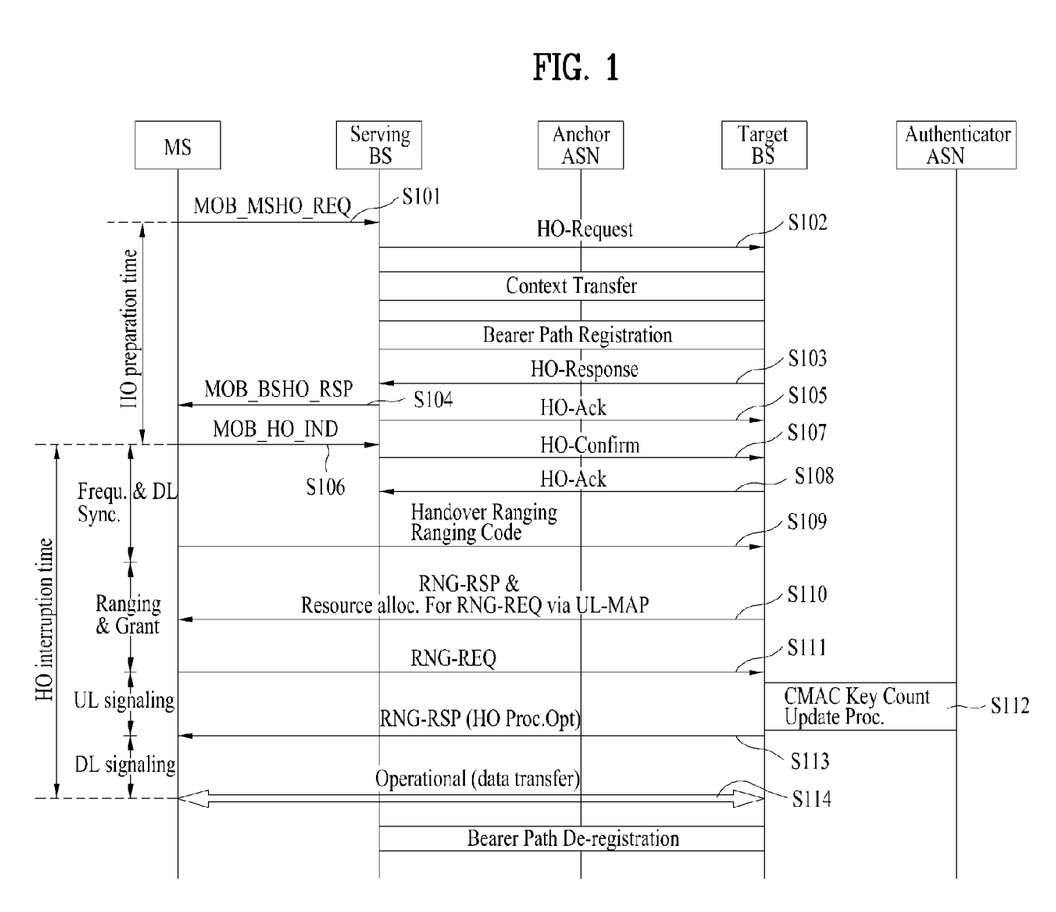
FIG. 1 is a diagram illustrating a handoff procedure used in an IEEE 802.16e system.

FIG. 1 is a diagram illustrating a handoff procedure used in an IEEE 802.16e system.

A mobile station MS is registered with a serving base station SBS to transmit and receive data to and from the serving base station SBS. The serving base station SBS can periodically broadcast information on neighboring base stations existing within its coverage and a handover trigger condition to mobile stations through a MOB_NBR-ADV message.

The mobile station starts scanning for neighboring base stations based on the handover (HO) trigger condition while performing communication with the serving base station. If a scanning value exceeds a hysteresis margin, the mobile station transmits a handover request (MOB_MSHO-REQ) message, which includes a candidate handover base station (HO BS) field, to the serving base station to request handoff procedure (S101).

The serving base station that has received the handover request message notifies the candidate handover base stations included in the MOB_MSHO-REQ message, of handover request through the handover request (HO-REQ) message (S102).

At this time, the serving base station and the target base station (TBS) can exchange context information through a backbone network. Also, the serving base station and the target base station can configure and register a radio bearer path therebetween.

For the mobile station, which has requested handover, the candidate handover base stations (for example, TBS) transfer handover related information to the serving base station through a handover response (HO-RSP) message (S103).

The serving base station transmits the handover related information included in the HO-RSP message to the mobile station through a handover response (MOB_BSHO-RSP) message. At this time, the MOB_BSHO-RSP message includes information required for handover, such as action time for performing handoff, handover indication (HO-ID), and a dedicated handover CDMA ranging code (S104).

The serving base station transmits an acknowledgement signal (HO-ACK) to the target base station in response to the handover response message (S105).

The mobile station selects one target base station based on handover information included in the MOB_BSHO-RSP message transmitted through coordination of the serving base station. If the mobile station determines handover, it transmits a handover indication (MOB_HO-IND) message to the serving base station (S106).

The serving base station transmits a handover confirmation (HO-confirm) message to the target base station to notify that the mobile station will perform handover to the target base station (S107).

The target base station transmits an acknowledgement (HO-ACK) signal to the serving base station in response to the handover confirmation (HO-confirm) message (S108).

The mobile station transmits a ranging request message, which includes a handover ranging code (CDMA code), to the base station to synchronize with the target base station (S109).

The target base station that has received the CDMA code transmits success or failure of ranging and physical correction values, which will be used in the target base station, to the mobile station through a ranging response (RNG-RSP) message. Also, the target base station transmits an uplink map message, which includes uplink resource allocation information, to the mobile station (S110).

The mobile station can correct the existing physical values based on the physical correction values acquired through the RNG-RSP message. Also, if the mobile station does not need to correct the physical values, it transmits a ranging request (RNG-REQ) message to the target base station to allow the target base station to perform an authentication procedure, wherein the ranging request message includes a MAC address of the mobile station and other security information. At this time, the security information can include a CMAC key count (S111).

The target base station that has received the ranging request message performs a procedure of updating an authenticator ASN and the CMAC key count (S112).

The target base station transmits a ranging response message to the mobile station, wherein the ranging response message includes system information (SI) and handover optimization information (HO Proc. Opt.) that will be used in the same target base station as that will use the connection ID (S113).

If the target base station successfully finishes authentication of the mobile station, the mobile station performs communication with the target base station that has performed handoff (S114). Also, the radio bearer configured between the target base station and the serving base station is released.

Referring to FIG. 1, the period for performing the ranging procedure for synchronization with the target base station when the mobile station is performing handover is the handover interruption time. The step S109 of FIG. 1 is basically performed based on contention. Accordingly, if transmission of the handover ranging code is failed, the handover interruption time may become long. In order to solve this problem, the serving base station can allocate a dedicated code to the mobile station that performs handover.

Figure 2:
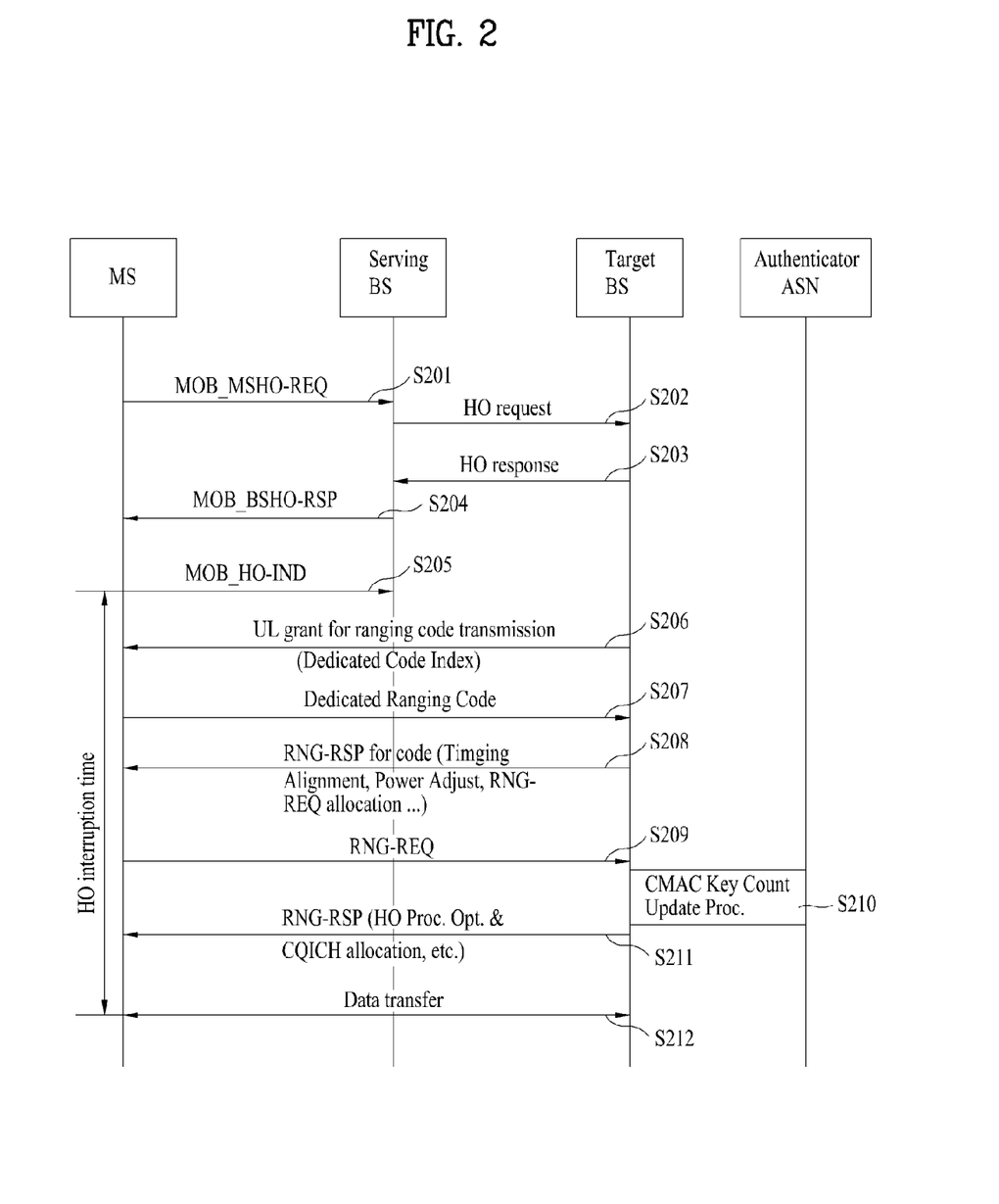
FIG. 2 is a diagram illustrating a handover procedure using a dedicated ranging code in accordance with one embodiment of the present invention.

FIG. 2 is a diagram illustrating a handover procedure using a dedicated ranging code in accordance with one embodiment of the present invention.

Since steps S201 to S205 of FIG. 2 are similar to the steps S101 to S106 of FIG. 1, their description will be omitted.

Referring to FIG. 2, the target base station (TBS) transmits a dedicate code index (DCI) to the mobile station MS by using uplink (UL) grant or uplink map (UL-MAP), wherein the dedicated code index represents a dedicated code for handover ranging (S206).

The mobile station can perform handover ranging by using the dedicated ranging code indicated by the allocated dedicated code index. In this case, since non-contention based ranging is performed, the possibility of failure in transmission of the dedicated ranging code may be lowered (S207), The target base station that has received the ranging code transmits a ranging response message, which includes one or more of timing alignment information, power adjustment information and uplink resource allocation information for transmission of the ranging request message, to the mobile station (S208).

The mobile station corrects the physical values by using the information included in the ranging response message, and transmits a ranging request message for performing an authentication procedure, to the target base station through the allocated uplink radio resource. At this time, the ranging request message can include a CMAC key count value of the mobile station (S209).

The target base station and the authenticator ASN perform a procedure of updating the CMAC key count value received from the mobile station (S210).

The target base station transmits a ranging response message, which includes handover optimization information and CQICH allocation information, to the mobile station, whereby the handover procedure can be completed. Afterwards, the mobile station can transmit and receive data to and from the target base station (S211 and S212).

In FIG. 2, the mobile station can receive a dedicated code index (DCI) for non-contention based ranging through messages (UL grant or UL-MAP) broadcasted by the target base station. According to one embodiment of the present invention, the serving base station can transmit the dedicated code index (DCI) to the mobile station.

For example, in the step S203, the target base station allocates the dedicated code index (DCI) to the mobile station and notifies the serving base station of information on the dedicated code index through a backbone network. At this time, the serving base station can transmit the handover response (MOB_BSHO-RSP) message, which includes a dedicated ranging code, to the mobile station in the step S204. In this case, since the step S206 may be omitted, the handover ranging procedure can be more simplified.

According to another embodiment of the present invention, information included in the ranging message can previously be shared between the serving base station and the target base station.

For example, the ranging messages (RNG-REQ/RNG-RSP) transmitted and received in the steps S208 and S209 of FIG. 2 can include various kinds of information. Most of information included in the ranging messages can be exchanged through the backbone network between the serving base station and the target base station.

If the information included in the ranging messages is transmitted and received through the backbone network, the mobile station and the target base station can simplify the ranging procedure by performing the authentication procedure using the ranging code. In this case, a method for performing authentication for a mobile station using a ranging code transmitted from the mobile station may be considered.

In a general handover ranging procedure, authentication of the mobile station can be performed through the CMAC key included in the ranging request message. The CMAC key can be generated using an authentication key (AK) of 20 bytes.

However, the CMAC key is included in a specific message in view of security of the specific message but is not required for authentication for the mobile station that performs handover. In other words, if the ranging procedure is simplified in accordance with another embodiment of the present invention, a part of authentication keys can be transmitted and received between the mobile station and the target base station, whereby authentication of the mobile station can be performed.

In other words, if authentication of the mobile station is performed using the ranging code of the step S207, the ranging procedure of the steps S209 to S211 can be omitted. In this case, the handover optimization information and CQICH allocation information transmitted in the step S211 can be included in the ranging response message of the step S208.

Figure 3:
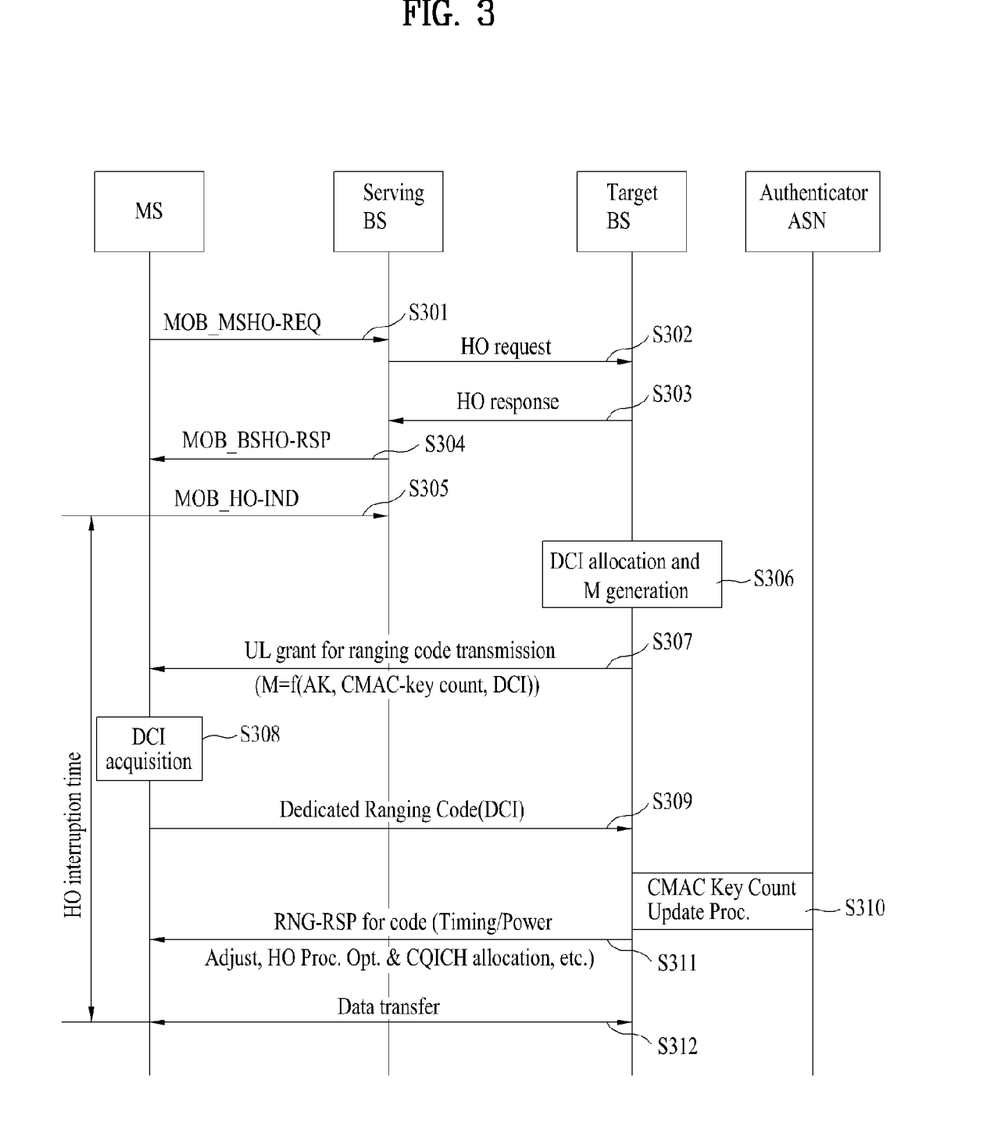
FIG. 3 is a diagram illustrating one of methods of performing handover using a dedicated code index (DCI) in accordance with another embodiment of the present invention.

FIG. 3 is a diagram illustrating one of methods of performing handover using a dedicated code index (DCI) in accordance with another embodiment of the present invention.

In more detail, FIG. 3 illustrates a method of transmitting authentication information M obtained using a dedicated code index (DCI) for non-contention based ranging without directly transmitting the DCI from a target base station and/or a serving base station to a mobile station.

Referring to FIG. 3, the mobile station MS is registered with the serving base station SBS to transmit and receive data to and from the serving base station. The serving base station SBS can periodically broadcast information on neighboring base stations existing within its coverage and a handover trigger condition to mobile stations through a MOB_NBR-ADV message.

The mobile station starts scanning for neighboring base stations based on the handover (HO) trigger condition while performing communication with the serving base station. If a scanning value exceeds a hysteresis margin, the mobile station transmits a handover request (MOB_MSHO-REQ) message, which includes a candidate handover base station (HO BS) field, to the serving base station (S301).

The serving base station that has received the handover request message notifies the target base station of the candidate handover base stations included in the MOB_MSHO-REQ message, of handover request by using the handover request (HO-REQ) message through the backbone network. At the time, the handover request message may further include an authentication key (AK) for the mobile station and a CMAC key count (S302).

The serving base station and the target base station (TBS) can exchange context information through the backbone network. Also, the serving base station and the target base station can configure and register a radio bearer path therebetween.

The target base station TBS transmits a handover response (HO-RSP) message, which includes handover related information, to the serving base station (S303).

The serving base, station transmits the handover related information included in the HO-RSP message to the mobile station through a handover response (MOB_BSHO-RSP) message. At this time, the handover related information includes information required for handover, such as action time for performing handover and handover indication (HO-ID) (S304).

After receiving the MOB_BSHO-RSP message, the mobile station transmits a handover indication (MOB_HO-IND) message to the serving base station to notify the serving base station of handover with the target base station (S305).

The target base station can allocate the dedicated code index (DCI) to perform non-contention based dedicated ranging with the mobile station. Also, the target base station can generate authentication information M by using the authentication key (AK) of the mobile station, the CMAC key count, and the DCI allocated to the mobile station (S306).

The following Equation 1 illustrates an example of a function for generating the authentication information M.

$$M=f(\text{AK},\text{CMAC-KEY count},\text{DCI}) \qquad \text{[Equation 1]}$$

After transmitting the handover indication (MOB_HO-IND) message to the serving base station, the mobile station can receive an uplink grant (UL Grant) message or uplink map (UL-MAP) message, which includes authentication information M, from the target base station (S307).

The mobile station can acquire a dedicated code index by using the authentication information. The following Equation 2 illustrates an example of a function for obtaining authentication information M.

$$\text{DCI}=f^{-1}(\text{AK},\text{CMAC-KEY count},M) \qquad \text{[Equation 2]}$$

The mobile station can acquire the DCI by substituting the authentication information M for the function for obtaining the DCI (S308).

The mobile station transmits the dedicated ranging code indicated by the acquired DCI to the target base station (S309).

The target base station can identify a mobile station that performs handover, by identifying the dedicated ranging code. Accordingly, the target base station can perform an authentication procedure with the corresponding mobile station. The target base station can perform a procedure of updating an authenticator ASN and a CMAC key count as one of authentication procedures (S310).

The target base station transmits a ranging response message to the mobile station in response to the ranging code for handover ranging, wherein the ranging response message includes one or more of timing alignment information, power adjustment information, handover procedure optimization information and CQICH allocation information (S311).

The handover procedure is completed, and the mobile station is registered with the target base station to transmit data (S312).

Figure 4:
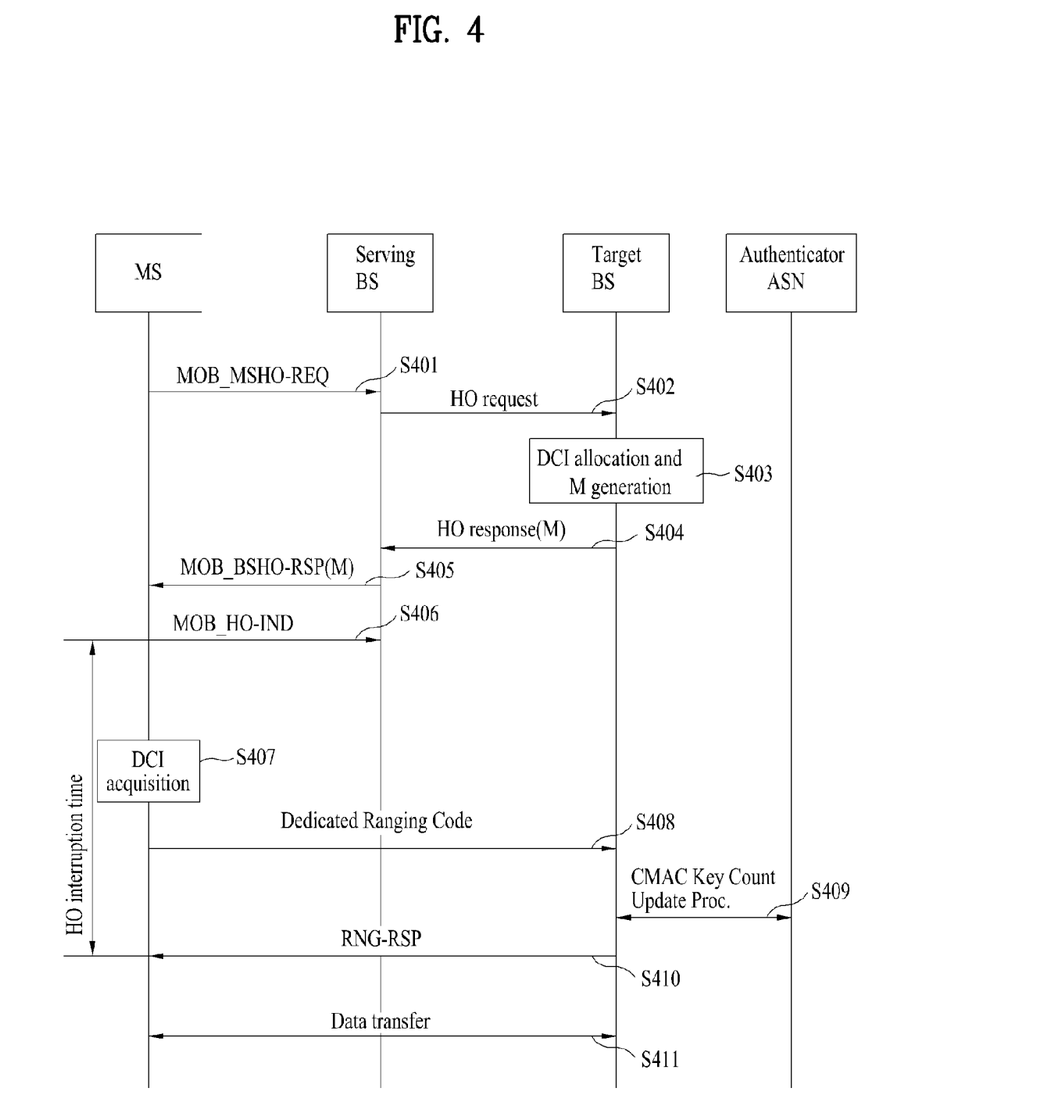
FIG. 4 is a diagram illustrating the other of methods of performing handover using a dedicated code index (DCI) in accordance with another embodiment of the present invention.

FIG. 4 is a diagram illustrating the other of methods of performing handover using a dedicated code index (DCI) in accordance with another embodiment of the present invention.

In more detail, FIG. 4 illustrates a method of transmitting authentication information M obtained using a dedicated code index (DCI) for non-contention based ranging without directly transmitting the DCI from a target base station and/or a serving base station to a mobile station.

Referring to FIG. 4, if the mobile station MS needs to perform handover under a wireless communication condition, it transmits a handover request (MOB_MSHO-REQ) message to the serving base station (S401).

The serving base station that has received the handover request transmits a handover request (HO-REQ) message to the target base station through a backbone network. At this time, the handover request (HO-REQ) message may further include an authentication key (AK) for the mobile station and a CMAC key count (S402).

The target base station that has received the handover request (HO-REQ) message can allocate a dedicated code index (DCI) to perform non-contention based dedicated ranging with the mobile station. Also, the target base station can generate authentication information M by using the authentication key (AK) of the mobile station, the CMAC key count, and the DCI allocated to the mobile station (S403). At this time, the authentication information can be generated using the Equation 1.

The target base station TBS transmits a handover response (HO-RSP) message, which includes handover related information and the authentication information M, to the serving base station (S404).

The serving base station transmits the handover related information and the authentication information M to the mobile station through a handover response (MOB_BSHO-RSP) message. At this time, the handover related information includes one or more of information required for handover, such as uplink resource allocation information for a ranging code, action time for performing handoff, and handover indication (HO-ID) (S405).

After receiving the MOB_BSHO-RSP message, the mobile station transmits a handover indication (MOB_HO-IND) message to the serving base station to notify the serving base station of handover with the target base station (S406).

After transmitting the handover indication message to the serving base station, the mobile station can acquire the DCI by using the authentication information M acquired in the step S405. In this case, the DCI can be obtained referring to the Equation 2 (S407).

The mobile station transmits a dedicated ranging code indicated by the DCI acquired in the step S407 to the target base station even without receiving an uplink map message or an uplink grant message from the target base station (S408).

The target base station can identify a mobile station that performs handover, by identifying the dedicated ranging code. Accordingly, the target base station can perform an authentication procedure with the corresponding mobile station. The target base station can perform a procedure of updating an authenticator ASN and a CMAC key count as one of authentication procedures (S409).

The target base station transmits a ranging response message to the mobile station in response to the ranging code for handover ranging, wherein the ranging response message includes timing alignment information, power adjustment information, handover procedure optimization information and CQICH allocation information (S410).

The handover procedure is completed, and the mobile station is registered with the target base station to transmit data (S411).

Requirements for Generating Authentication Information M

Hereinafter, requirements of a function (Equation 1) for generating authentication information M used in the embodiments of the present invention will be described in detail. Preferably, the function f for generating authentication information satisfies the following requirements.

It is assumed that $M_1=f(AK_1,\text{CMAC-KEY count}_1,DCI_1)$, $DCI_1=f^1(AK_1,\text{CMAC-KEY count}_1,M_1)$, $M_2=f(AK_2,\text{CMAC-KEY count}_2,DCI_2)$, and $DCI_2=f^1(AK_2,\text{CMAC-KEY count}_2,M_2)$. In this case, if $AK_1 \neq AK_3$ is satisfied for a value of $DCI_3=f^1(AK_3,\text{CMAC-KEY count}_3,M_1)$, it is preferable that $DCI_1 \neq DCI_3$ is satisfied for all cases.

In the embodiments of the present invention, the CMAC-KEY count may have different values or one same value per mobile station. Accordingly, the CMAC-KEY count may be omitted. In this case, the requirements of the function (f) for generating authentication information can be varied as follows.

It is assumed that $M_1=f(AK_1,DCI_1)$, $DCI_1=f^1(AK_1,M_1)$, $M_2=f(AK_2,DCI_2)$, and $DCI_2=f^1(AK_2,M_2)$. In this case, if $AK_1 \neq AK_3$ is satisfied for a value of $DCI_3=f^1(AK_3,M_1)$, it is preferable that $DCI_1 \neq DCI_3$ is satisfied for all cases.

When N number of DCIs for handover defined of a cell used in the embodiments of the present invention exist (i.e., $DCI_n$ (n=1, ..., N)), it is preferable that the function (f) for generating authentication information satisfies the following condition.

When $X=f^{-1}(AK_3,M_1)$ and $AK_1 \neq AK_m$, if the function for generating authentication information satisfies $X \notin \{DCI_n | n=1, \ldots N\}$, handover of another mobile station is performed without failure.

Method of Transmitting Authentication Information M

Hereinafter, another method of transmitting authentication information M in accordance with another embodiment of the present invention will be described.

1. Notification Method from Serving Base Station

The serving base station generates authentication information M and notifies the target base station and the mobile station of the generated authentication information. For example, the serving base station that has received, the handover request (MOB_MSHO-REQ) message from the mobile station allocates the DCI to the mobile station, and generates the authentication information M by using one or more of the AK of the mobile station, the CMAC-KEY count and the DCI. The serving base station transmits the authentication information M to the target base station through the backbone network, and transmits the handover response (MOB_BSHO-RSP) message, which includes the authentication information M, to the mobile station.

2. Method of Using Uplink Map (UL-Map) Message

The method of using a UL-MAP message is similar to a method of transmitting a fast ranging information element (IE) within a UL-MAP from a target base station in the IEEE 802.16e system. If the UL-MAP is performed for separate coding, the mobile station cannot identify a MAP that includes authentication information.

In this case, the target base station allocates specific connection identifier (CID) or mobile station identifier (MSID) to the mobile station to transmit the authentication information M, and then performs CRC masking of the UL-MAP by using the CID or the MS ID, whereby the mobile station can identify the corresponding UL-MAP. Alternatively, if the base station performs CRC masking of a specific MAP by using a known ID such as HO ranging ID and then transmits the specific MAP, the mobile station can receive the specific MAP masked with such ID.

3. Method of Using Broadcast Message

The base station can allocate predetermined connection for notification of handover (HO) related information to the mobile station. The base station can transmit a broadcast message for transmission of such predetermined connection to the mobile station, wherein the broadcast message includes authentication information M.

Also, similarly to a method of allocating a forward access channel (FACH) in a universal mobile telecommunications system (UMTS), ID=000X is effectively allocated as "Handover Ranging Code allocation channel". In other words, the ID=000X channel becomes a channel that can be received by all mobile stations that perform handover. Accordingly, the base station can transmit the authentication information M to the mobile station by using the ID=000X channel. Resource allocation information on this connection can be transmitted to the mobile station by being included in the UL-MAP together with CID.

Also, the base station can configure a specific channel that transmits a broadcast message, so as to broadcast the authentication information together with other broadcast information through the specific channel. The base station can broadcast the UL-MAP, which includes resource allocation information for transmitting authentication information and CID, to the mobile station.

Also, the base station can fix a location a radio resource to which authentication information is transmitted and then transmit the authentication information through the fixed location only.

Method of Configuring Dedicated Ranging Code

The dedicated ranging code can be allocated in various manners. The dedicated ranging code should not be used by other users except for a user dedicated for use.

Generally, the base station within a cell notifies the mobile station of information on a ranging code through a broadcast channel. At this time, the base station notifies the mobile station of a range of the ranging code depending on purpose of use of the ranging code.

For example, if a PN based code is used as the ranging code, the base station can notify the mobile station of a primitive polynomial and an initial state. The base station and the mobile station generate a long code by using the primitive polynomial and the initial state, and can use the long code by cutting the code at a predetermined length and giving index to each of the cut codes depending on purpose of use.

In this case, the base station can notify the mobile station of a ranging code index (for example, initial ranging, handover ranging, periodic ranging, or BW request ranging) based on purpose of use of each code through the broadcast message.

A specific range of the aforementioned long ranging code can be used for a dedicated ranging channel. The base station can notify a specific mobile station of the specific range to prevent the dedicated ranging channel from being used by other mobile stations without permission. Alternatively, the base station can notify the specific mobile station of only information on the allocated zone instead of the dedicated ranging channel zone to allow other mobile stations not to know the use possibility of the dedicated ranging channel.

Reuse Method of Ranging Code

The ranging code is preferably allocated in such a manner that code sets used between neighboring cells are not overlapped with each other. This is to prevent interference with other cells from occurring by using different ranging codes between neighboring cells. However, the same code can be reused for cells far away from each other, not neighboring cells.

If each cell has a primary ranging code set and a dedicated ranging code set, the dedicated ranging code set used by the first cell can be selected from the primary ranging code set of the second cell. In this way, the limited ranging code can be used efficiently. Information on the dedicated ranging code can be transmitted to a specific mobile station only through handover related messages.

Additionally, if a zone for transmission of a ranging code is different per cell, each cell can easily reuse the same code. In other words, even though neighboring cells use the same ranging code set, if different resources are used in a time and/or frequency domain, the neighboring cells can reuse the same ranging code.

Figure 5:
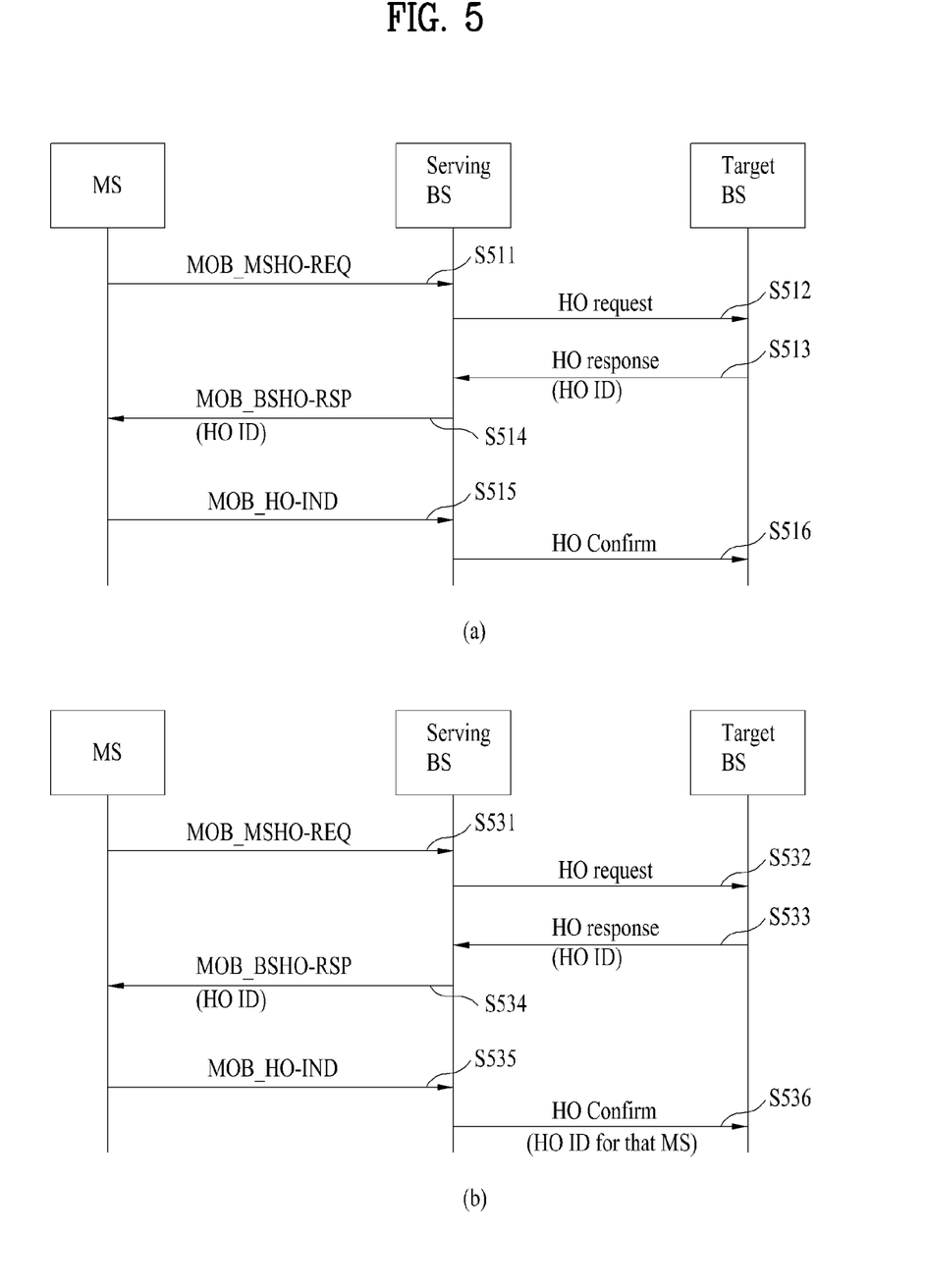
FIG. 5 is a diagram illustrating methods of transmitting handover identifier (HO ID) in accordance with still another embodiment of the present invention.

FIG. 5 is a diagram illustrating methods of transmitting handover identifier (HO ID) in accordance with still another embodiment of the present invention.

The handover identifier (HO ID) is generated for initial ranging by the target base station. However, since the handover identifier is allocated to candidate base stations in a handover preparation step before the target base station is determined, a problem occurs in that a candidate base station that does not actually perform handover generates an unnecessary ID.

FIG. 5 relates to a method that can additionally be applied to the embodiments of the present invention described with reference to FIG. 2 to FIG. 4. Accordingly, the description of FIG. 5 repeated to the description of FIG. 2 to FIG. 4 will be omitted and will refer to FIG. 2 to FIG. 4.

Referring to FIG. 5(*a*), the mobile station MS transmits a handover request (MOB_MSHO-REQ) message to the serving base station SBS (S511), and the serving base station transmits a handover request (HO-request) message to the target base station TBS through the backbone network (S512).

The target base station that has received the handover request (HO-request) message generates a handover identifier and transmits a handover response (HO-response) message to the serving base station, wherein the handover response (HO-response) message includes the handover identifier (S513). The serving base station transmits a handover response (MOB_BSHO-RSP) message to the mobile station, wherein the handover response (MOB_BSHO-RSP) message includes the handover identifier (S514).

The mobile station transmits a handover indication message to the serving base station, wherein the handover indication message indicates the serving base station to perform handover (S515). The serving base station transmits a handover completion message to the target base station (S516).

FIG. 5(*b*) illustrates a method of generating a handover identifier in a serving base station not a target base station. In other words, the serving base station sets a size of the handover identifier to a value greater than a predetermined bit (e.g., 8 bits), and can generate a handover identifier independently.

Referring to FIG. 5(*b*), the mobile station MS transmits a handover request (MOB_MSHO-REQ) message to the serving base station SBS (S531), and the serving base station transmits a handover request (HO-request) message to the target base station TBS through the backbone network (S532).

The target base station that has received the handover request (HO-request) message transmits a handover response (HO-response) message to the serving base station (S533). The serving base station generates a handover identifier (HO ID) greater than a predetermined size and transmits a handover response (MOB_BSHO-RSP) message to the mobile station, wherein the handover response (MOB_BSHO-RSP) message includes the handover identifier (S534).

The mobile station transmits a handover indication message to the serving base station, wherein the handover indication message indicates the serving base station to perform handover (S535). The serving base station transmits the handover identifier allocated to the mobile station to the target base station by using the handover completion message (S536).

The handover related messages described in FIG. 1 to FIG. 4 can be used as the handover related messages used in FIG. 5(*a*) and FIG. 5(*b*).

As further still another embodiment of the present invention, the mobile station and the base station through which the embodiments of the present invention in FIG. 1 to FIG. 5 are carried out will be described.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages.

The mobile station used in the embodiments of the present invention can include a low power radio frequency (RF)/intermediate frequency (IF) module. Also, the mobile station can include a means, module or part for performing a controller function for performing the aforementioned embodiments of the present invention, a medium access control (MAC) frame variable control function based on service characteristics and radio wave condition, a handover function, an authentication and encryption function, a packet modulation and demodulation function for data transmission, a quick packet channel coding, and a real-time modem control function.

The base station can transmit data received from the upper layer to the mobile station through a wire or wireless. The base station can include a low power radio frequency (RF)/intermediate frequency (IF) module. Also, the base station can include a means, module or part for performing a controller function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function.

The embodiments of the present invention can be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of supporting handover, the method performed by a mobile station (MS) and comprising:
transmitting a handover request message to a serving base station (SBS);
receiving a handover response message, which includes handover related information and authentication information, from the SBS, wherein the authentication information is generated based on an authentication key (AK) of the MS, a CMAC (Cipher-based Message Authentication Code) key count of the MS, and a dedicated code index (DCI), and the authentication information is generated by a target base station (TBS);
deriving the DCI based on the AK, the CMAC key and the authentication information;
obtaining a dedicated code index (DCI) indicating a dedicated ranging code indicated by the DCI;
transmitting the dedicated ranging code to the TBS for performing a non-contention based ranging; and
receiving a ranging response message from the TBS in response to the dedicated ranging code.

2. The method of claim 1, wherein the ranging response message includes timing alignment information, power adjustment information, handover procedure optimization information and CQICH allocation information.

3. The method of claim 1, wherein the handover related information includes information on action time for performing handover and a handover indication field.

4. The method of claim 1, wherein the handover response message further includes a handover identifier (HO ID).

5. A method of supporting handover, the method performed by a target base station (TBS) and comprising:
receiving a handover request message from a serving base station (SBS), the handover request message including an authentication key (AK) of a mobile station (MS) and a Cipher-based Message Authentication Code (CMAC) key count of the MS;
allocating a dedicated code index (DCI) indicating a dedicated ranging code for performing non-contention based dedicated ranging with the MS;
generating authentication information by using the AK, the CMAC key count, and the DCI;
transmitting a handover response message including handover related information and authentication information to the SBS; and
receiving the dedicated ranging code from the MS.

6. The method of claim 5, further comprising:
transmitting a ranging response message in response to the dedicated ranging code, the ranging response message including timing alignment information, power adjustment information, handover procedure optimization information and CQICH allocation information.

7. The method of claim 6, wherein the handover related information includes information on action time for performing handover and a handover indication field.

8. A method of supporting handover, the method performed by a serving base station and comprising:
receiving a first handover request message from a mobile station (MS);
transmitting a second handover request message to a target base station (TBS), the second handover request message including an authentication key (AK) of the mobile station and a Cipher-based Message Authentication Code (CMAC) key count;
receiving a second handover response message, which includes authentication information and handover related information, from the TBS;
transmitting a first handover response message, which includes the authentication information and the handover related information, to the MS wherein the authentication information is generated by the TBS based on the AK, the CMAC key count and a dedicated code index (DCI), and the DCI indicates a dedicated ranging code assigned for a non-contention based ranging.

9. The method of claim 8, wherein the handover related information includes information on action time for performing handover and a handover indication field.

10. The method of claim 8, wherein the first handover response message further includes a handover identifier (HO ID) greater than a predetermined size.

* * * * *